United States Patent [19]
Robinson et al.

[11] Patent Number: 5,546,269
[45] Date of Patent: Aug. 13, 1996

[54] METERED ELECTRICAL SERVICE TAP

[75] Inventors: Darrell Robinson, Highland Township; Allen V. Pruehs, Howell; John Williams, Holly, all of Mich.

[73] Assignee: Ekstrom Industries, Inc., Farmington Hills, Mich.

[21] Appl. No.: 274,486

[22] Filed: Jul. 13, 1994

[51] Int. Cl.⁶ .................................................. H02B 9/00
[52] U.S. Cl. ........................... 361/660; 324/156; 361/42; 361/668; 439/508
[58] Field of Search .............................. 324/74, 110, 156; 439/146, 167, 508, 517; 200/51 R, 51.12; 361/641, 643, 654, 659–661, 668–672, 622, 42

[56] References Cited

U.S. PATENT DOCUMENTS

| | | |
|---|---|---|
| 3,643,209 | 2/1972 | Coston . |
| 3,764,858 | 10/1973 | Burkhart, Jr. ........................... 317/107 |
| 4,041,358 | 8/1977 | Donahue ................................ 361/365 |
| 4,359,645 | 11/1982 | Schacht et al. . |
| 4,413,306 | 11/1983 | Erickson ................................. 361/361 |
| 4,450,503 | 5/1984 | Warner . |
| 4,532,574 | 7/1985 | Reiner et al. . |
| 4,819,129 | 4/1989 | Erickson . |
| 4,977,482 | 12/1990 | Langdon et al. . |
| 5,033,973 | 7/1991 | Pruehs ................................... 439/167 |
| 5,045,969 | 9/1991 | Menasco ................................ 361/364 |
| 5,097,383 | 3/1992 | Heard et al. . |
| 5,134,544 | 7/1992 | Howell . |
| 5,216,802 | 6/1993 | Cole et al. . |

OTHER PUBLICATIONS

Ekstrom Temporary Metered Power Device brochure Models TMP–2600, TMP–2649 (1 page) (both sides).
Ekstrom Service Limiter Adapter Brochure (4 pages).
Ekstrom Bulletin 5007, Jun.–1–82, revised Jun., 1985 (4 pages).
Ekstrom Temporary Service Adapters 700 Series Brochure (4 pages ).

*Primary Examiner*—Gerald P. Tolin
*Attorney, Agent, or Firm*—Basile and Hanlon, P.C.

[57] ABSTRACT

A housing includes a base with blade terminals insertable into jaw contacts in an electrical watthour meter socket. First and second watthour meter receiving shells are mounted on the housing, each having a pair of line jaw contacts connected in parallel to each other and to line blade terminals in the base. Electrical conductors extend from the load jaw contacts in one of the shells to a junction box mounted on the housing to provide a connection to an external electrical conductor. An electrical power disconnect device is mounted in one of the shells, and is connected in series by conductors between the line jaw contacts in both shells. The power disconnect device includes a movable external member having an end portion which slidably extends through the side wall of one of the shells. In one embodiment, the end portion is a separate rod which is biased into contact with the movable member. Electrical power disconnect indicia are formed on the movable external member or the rod and are visible externally of the one shell when the external member is in an extended position to indicate that the power disconnect device is in a non-power conducting state. A lock is optionally insertable through an aperture in the end portion of the external member or the rod to prevent the external member from switching the power disconnect device to a power conducting state.

23 Claims, 9 Drawing Sheets

METERED ELECTRICAL SERVICE TAP

BACKGROUND OF THE INVENTION

1. Field of the Invention:

The present invention relates, in general, to watthour meters and, specifically, to socket adapters for watthour meters.

2. Description of the Art:

Electrical power is supplied to an individual site or service by external electrical power line conductors located above or below ground. In a conventional arrangement, electrical power line conductors are connected to contacts in a watthour meter socket mounted on a building wall. Electrical load conductors are connected to another set of contacts in the socket and extend to the electrical distribution network in the building. A watthour meter is plugged into the contacts in the meter socket to measure the electric power drawn through the load conductors.

Due to the current trend toward the use of plug-in watthour meters, socket adapters have been devised which convert A-base type bottom connected watthour meter sockets to receive plug-in watthour meters. Another type of socket adapter has been devised which allows the installation of other devices between the watthour meter socket and a plug-in watthour meter. Such watthour meter socket adapters have also been provided with power disconnect devices, such as circuit breakers or ground fault circuit interrupters, both for protecting the electrical service as well as, in certain applications, to limit the amount of power supplied to the site. Such power disconnect devices may include an elongated plunger, the end of which extends outwardly through an opening in the annular side wall of the socket adapter when the circuit breaker is in the open or power disconnected position. The exposed end of the plunger can be pushed through the side wall of the watthour meter socket adapter to close the circuit breaker and to reapply power to the site. In certain of these devices, the ends of the plungers extending through the sidewall of the adapter have been colored red for high visibility of a tripped or open condition of the circuit breaker, etc.

For special applications, auxiliary enclosures or boxes have been attached to or mounted on the watthour meter socket and/or socket adapter. Such enclosures or boxes contain an electrical outlet or other electrical connector attached to the power line or load contacts in the watthour meter socket or socket adapter for powering external devices mounted in the auxiliary enclosure. Examples of such auxiliary enclosures include a temporary metered power adapter, Model numbers TMP SP2600 and TMP 2649, and the watthour meter socket adapter with interface connection disclosed in U.S. Pat. No. 4,977,482, both sold and/or owned by Ekstrom Industries, Inc., Farmington Hills, Mich., the assignee of the present invention, as well as the temporary metered power devices disclosed in U.S. Pat. Nos. 5,097,383 and 5,216,802. When such auxiliary outlets or connectors are used, the power supplied to the outlet or connector may be either metered or unmetered.

It is also known to construct a watthour meter socket adapter as a temporary service adapter, such as a temporary service adapter, model 700 series sold by Ekstrom Industries, Inc. In such an adapter, lugs are connected to the line contacts in the socket adapter and provide a connection for a cable which passes through the side wall of the socket adapter to a second, remotely spaced socket adapter to provide electrical power to a remote site from a primary site.

It is also known to construct watthour meter socket adapters which contain two side-by-side watthour meter receiving shells as shown by the 5000 series 2 in trough in-series adapters sold by Ekstrom Industries, Inc. In such a dual watthour meter socket adapter, a single base is provided with blade terminals which plug into the jaw contacts in a single watthour meter socket. The blade extensions of jaw contacts in each shell of the adapter are connected by electrical conductors to the blade terminals in the base. In such a dual watthour meter socket adapter, the load contacts of one shell are connected to the line contacts in the adjacent shell and the load contacts in the adjacent shell are connected to the load distribution network of a building or house. This dual adapter disposes two watthour meters plugged into the respective shells in series with each other for comparative testing of two meters, load surveys, metering of both reactive power and kilowatt hours, etc.

Such devices are not suitable for applications where an auxiliary electrical service separate from the primary metered service supplied to a site is needed for example, a separate metered service to an outlet supplying power to recharge an electric vehicle. Thus, it would be desirable to provide a separate metered electrical service at a single meter socket which is accessible separate from the primary metered service. It would also be desirable to provide a dual watthour meter socket adapter which includes an auxiliary enclosure containing electrical connections connected to the load contacts of one of the watthour meter sockets to enable external conductors or cables to be easily connected to the second metered service without interrupting the primary metered service through the other watthour meter in the socket adapter. It would also be desirable to provide a dual watthour meter socket adapter which includes a power disconnect device having an extendible rod accessible exteriorly of the watthour meter socket adapter to close the power disconnect device as well as to provide an easily visible indication that the power disconnect device is in the open or off position. It would also be desirable to provide a dual watthour meter socket adapter in which the external portion of the rod may be locked in the extended position to provide safe access to the conductors in an auxiliary enclosure attached to the watthour meter socket adapter.

SUMMARY OF THE INVENTION

The present invention is a metered electrical service tap for providing metered electrical power to a separate electrical connection, outlet, cable, etc., independent from the conventional metered power supplied to a building load distribution network through a single watthour meter socket.

The present metered electrical service tap includes a housing having a hollow interior chamber. A plurality of electrical blade terminals are mounted on and extend outward from the housing for releasable insertion into the jaw contacts of a watthour meter socket. First and second watthour meter receiving means are mounted on the housing, each adapted for receiving one watthour meter therein. A plurality of jaw contacts are mounted in the first and second watthour meter receiving means for electrically receiving the blade terminals of a watthour meter in a plug-in connection. Conductor means are disposed in the housing for electrically connecting the jaw contacts in the first and second watthour meter receiving means and the plurality of electrical blade terminals, the conductor means connecting certain of the jaw contacts in the first and second watthour meter receiving means in parallel with each other and to certain of the blade terminals.

A junction box is attached to the housing and disposed in communication with the interior chamber of a housing. Electrical conductors have one end connected to load jaw contacts in one of the watthour meter receiving means and another end disposed in the junction box for connection to an external electrical circuit, cable, conductor, etc. A ground connection to an earth ground electrode extends through the watthour socket and the housing to a ground terminal mounted in the junction box.

Electrical power disconnect means are mounted in one of the watthour meter receiving means and connected to certain of the jaw contacts of the one watthour meter receiving means for selectively controlling the supply of electrical power through the one watthour receiving means. The power disconnect means may be connected in series between the line jaws contacts of the two watthour meter receiving portions or, alternately, between the load jaw contacts in one of the watthour meter receiving portions and the conductors extending to the junction box.

In one embodiment, the power disconnect means comprises a circuit breaker having switchable contacts. A reciprocal plunger is formed as a part of the circuit breaker and has an end extending outward from the circuit breaker. The plunger is movable from a first position disposed close to the circuit breaker when the circuit breaker is in a closed or in an electrically conducting state to a second position extending away from the circuit breaker when the circuit breaker is in an electrical power non-conducting or off position.

A rod is slidably mounted through an aperture formed in one of the watthour meter receiving means. Means are provided for biasing the rod into contact with one end of the plunger of the power disconnect means such that the rod is movable with movement of the plunger. The rod has an end portion extending outward from the watthour meter receiving means when the plunger is in the extended position corresponding to an open position of the power disconnect means or circuit breaker. Indicia is formed on an end portion of the rod and is visible exteriorly of the one watthour meter receiving means when the power disconnect means or circuit breaker is in the electrical power disconnected or off position to visibly indicate that the power disconnect means or circuit breaker is in the off position. Means are also provided for locking the rod in the extended position to prevent the plunger of the circuit breaker from being urged toward the circuit breaker to close the contacts of the circuit breaker.

In another embodiment, the power disconnect means is in the form of a ground fault circuit interrupter (GFCI) having an external member movable in response to the switching of the GFCI between conducting and non-conducting states. A plate is mounted over the GFCI and engages the external member so as to be movable therewith. In this embodiment, the rod is attached to the plate.

In yet another embodiment, the plunger is mounted to one side of the circuit breaker and is moved by movement of an arm on the circuit breaker between two positions. In this embodiment, the plunger has a length such that one end slidably extends through an aperture in one of the watthour meter receiving means and is disposed exteriorly of the watthour meter receiving means when the circuit breaker is in the open or power disconnecting position. The "off" indicia is disposed on the exterior end of the plunger along with an aperture for receiving a lock means to lock the plunger in the power disconnecting position. The plunger in the first two embodiments may also be formed with a length to extend exteriorly of the watthour meter receiving portion. This plunger construction eliminates the need for the slidable rod and rod biasing means.

A hanger is mounted on the housing of the metered service tap for temporarily mounting the housing on a flange on a meter socket while the ground conductor in the housing is passed through the socket and attached directly to an earth ground electrode.

The unique metered electrical service tap of the present invention uniquely mounts two watthour meters in a single watthour meter socket, with the jaw contacts of each of the two watthour meters being connected to the jaw contacts of the socket to provide two separate metered power services, one service being connected in a conventional manner to an electrical load power distribution network of a building, house, etc. Conductors extending from the load jaw contacts of one of the watthour meter receiving means in the housing of the metered electrical service tap terminate in a junction box which is accessible independently from access to the watthour receiving means and, in particular, the watthour meter contacts connected to the electrical load distribution network of the associated building, house, etc. Through the use of a power disconnect means connected to certain of the jaw contacts of the two watthour meter receiving means, electrical connections to the conductors in the junction box can be safely made by service personnel when the power disconnect means disposed in an off position. Further, the provision of an extendible rod movably associated with the plunger or the switchable external member of the power disconnect means, or simply, an elongated plunger, provides a unique "off" indicator of the position of the power disconnect means externally of the housing to further aid in safe wiring connections to the ends of the conductors in the junction box. The ends of the conductors may be provided with wing nuts, or any suitable electrical connection, including an electrical outlet, connector, etc., for easy connection to an external electrical conductor, cable, plug, etc., to provide separate metered electrical power to an external circuit.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
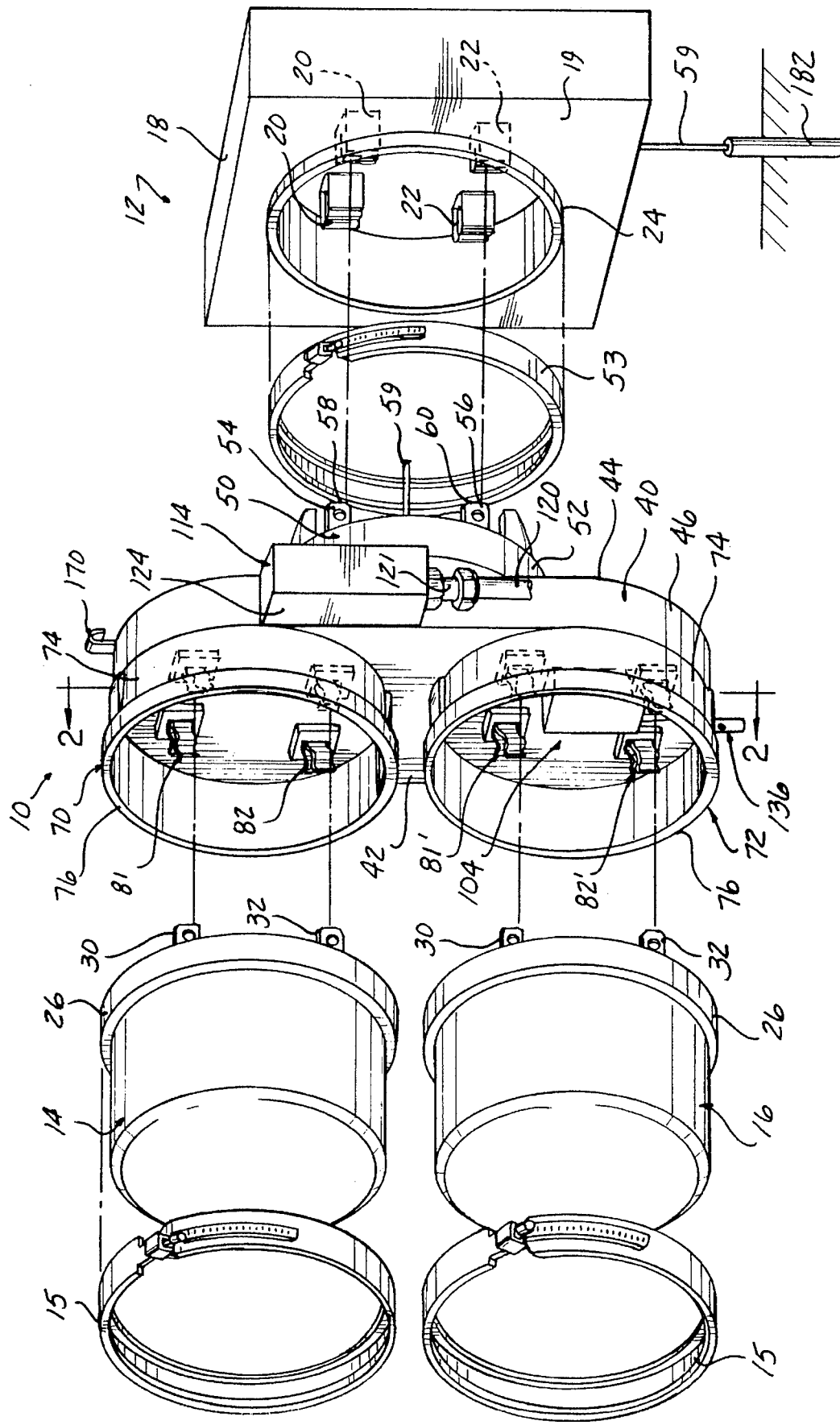
FIG. 1 is an exploded, perspective view of a metered electrical service tap constructed in accordance of the teachings of the present invention.

Referring now to FIG. 1, there is depicted a metered electrical service tap constructed in accordance of the teachings of the present invention. By way of background, the metered service tap 10 of the present invention is adapted to be plugged into a conventional watthour meter socket 12 and receives two conventional watthour meters 14 and 16 in separate watthour meter receiving portions or shells, as described hereafter.

The watthour meter socket 12 is of conventional construction in that it includes a housing 18 which is mounted on a suitable wall or building surface. A plurality of jaw-type contacts are mounted in the housing 18. For single phase electrical service, a pair of line jaw contacts 20 and a pair of load jaw contacts 22 are provided. The front cover 19 of the socket housing 18, although depicted in the form of a ring style socket with an outwardly extending, raised, annular flange 24, may also be of the ringless-style type.

The watthour meters 14 and 16 are also of conventional construction and include an annular mounting flange 26 which extends radially outward from the base of the watthour meter. A plurality of line and load blade terminals 30 and 32, respectively, extend outward from the base for plug-in connection into the metered electrical service tap 10.

Figure 2:
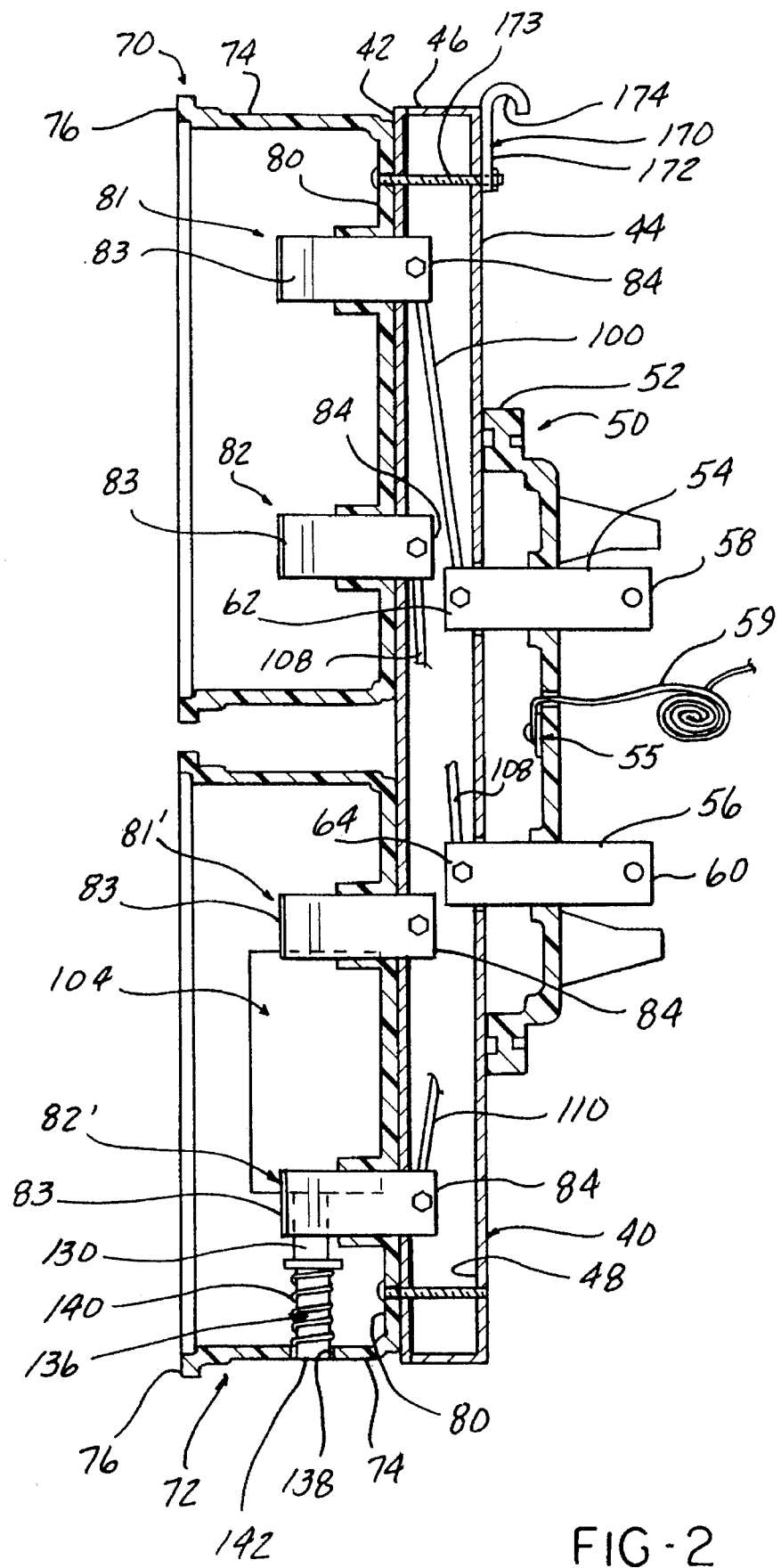
FIG. 2 is a cross sectional view generally taken along line 2—2 in FIG. 1.

As shown in FIGS. 1 and 2, the metered electrical service tap 10 includes a housing 40 of a suitable configuration. The housing 40 is formed with a front wall or surface 42, an opposed, spaced, back wall or surface 44 and a peripheral side flange 46 interconnecting the front and back walls 42 and 44. The interconnected front and back walls 42 and 44 and the peripheral side wall 46 surround and form a hollow, interior chamber 48, as shown in FIG. 2.

A base 50 having an annular peripheral edge 52 is securely connected to the back wall 44 of the housing 40 by means of suitable fasteners. The edge 52 engages the flange 24 on the cover of a ring-style socket 12 and receives a conventional seal ring 53 thereover. Alternately, the base 50 can be formed as an integral part of the back wall 44 of the housing 40.

A plurality of blade terminals, such as a pair of line blade terminals, each denoted by reference number 54, and a plurality of spaced, load blade terminals, each denoted by reference number 56, are mounted in the base 50. Typically, the blade terminals 54 and 56 are held in place on the base 50 by means of cotter pins, not shown. The exterior ends 58 and 60 of the pairs of blade terminals 54 and 56, respectively, are designed to engage the jaw contacts 20 and 22 in the watthour meter socket 12 in a snap-in connection. The opposite ends 62 and 64 of each of the pairs of blade terminals 54 and 56, respectively, are disposed within the interior chamber 48 in the housing 40.

A ground terminal 55 is mounted in the base 50 and connected to earth ground by a long conductor 59 through the socket 12 when the base 50 is plugged into the socket 12. The conductor 59 has a long length to enable it to pass through the socket 12 and be connected directly to a ground electrode for an adequate ground connection. A conductor 57 runs from the ground terminal 55 in the base 50 through the housing 40 to a ground terminal 61 in an external enclosure or box 114 as described hereafter.

Figure 5:
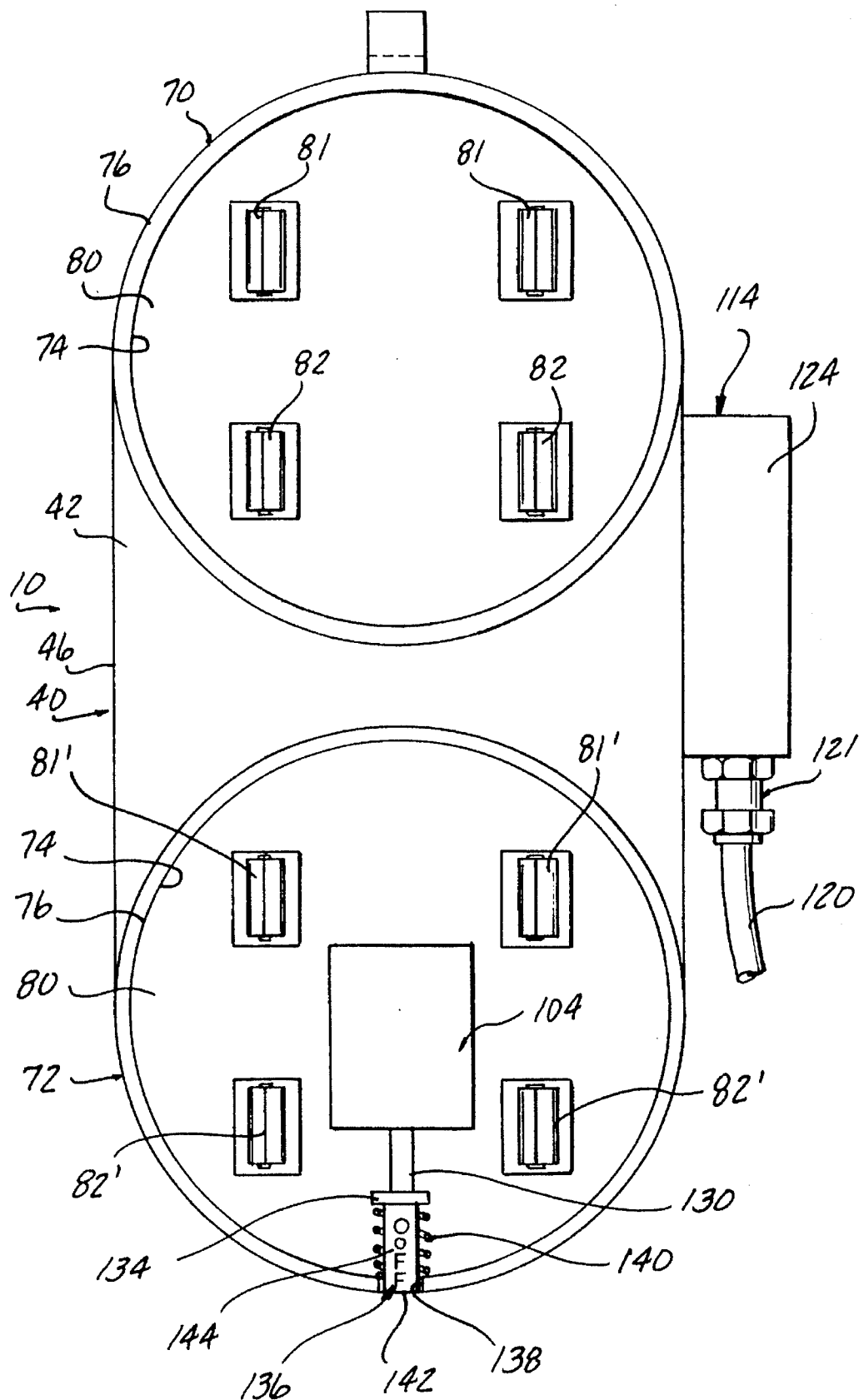
FIG. 5 is a front elevational view of the metered electrical service tap shown in FIG. 1.

A pair of spaced watthour meter receiving portions or shells 70 and 72, shown in FIGS. 1, 2 and 5, are mounted on the front wall 42 of the housing 40 by means of suitable fasteners. The shells 70 and 72 are of substantially identical construction and include an annular side wall 74 which terminates in an outer annular mounting flange 76. The flange 76 engages the flange 26 on the watthour meter 14 or 16 and receives a conventional seal ring 15 thereover to lockingly mount a watthour meter 14 or 16 in each shell 70 or 72.

Each shell 70 and 72 includes a bottom wall 80 which is attached by means of fasteners to the front wall 42 of the housing 40. A plurality of mounting bosses, each with an interior slot, are formed in the bottom wall 80 and receive an electrical contact 81, 82, 81' and 82' each of which has a jaw contact 83 at one end and a blade terminal 84 at an opposite end, with the blade terminal 84 being disposed within the hollow chamber 48 in the housing 40. The jaw contacts 82 of the electrical contacts 81, 82, 81' and 82' are disposed within the annular side wall 74 of each shell 70 and 72. The contacts 81, 82, 81' and 82' are held in a secure position on the bottom wall 80 by means of suitable fasteners, such as cotter pins, not shown. The contacts 81 and 82, each provided as a pair of contacts in a single phase socket adapter, are mounted in the shell 70 with the contacts 81' and 82' mounted in the shell 72. The jaw contacts 83 of each contact 81, 82, 81' and 82' are positioned to receive the blade terminals 30 and 32 of the watthour meters 14 and 16 in a snap-in connection, as is conventional.

Figure 3:
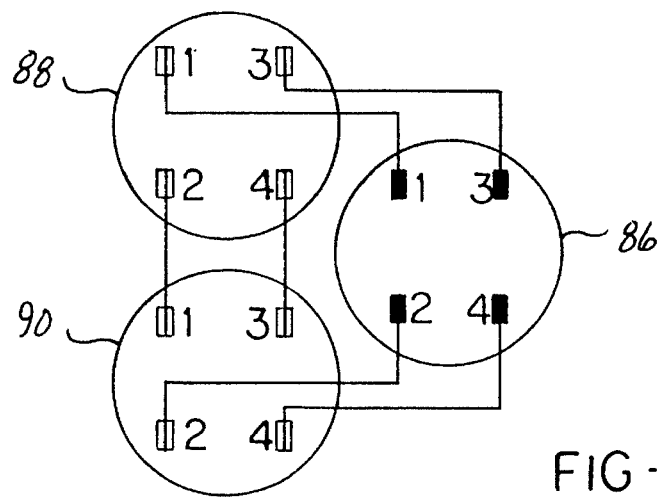
FIG. 3 is a schematic diagram of a prior art dual, series connected, watthour meter socket adapter.

FIG. 3 depicts a schematic diagram of a prior art series connected dual watthour meter socket adapter, such as the 2 in trough in-series adapter sold by Ekstrom Industries, Inc. As shown in FIG. 3, line blade terminals 1, 3 in a base 86 are connected by conductors to the line blade terminals 1, 3 of a first or primary watthour meter receiving shell 88. The load jaw contacts 2, 4 in the first or primary shell 88 are connected by electrical conductors to line jaw contacts 1, 3 in a second shell 90. Load jaw contacts 2, 4 in the second shell 90 are connected by suitable conductors to the load blade terminals 2, 4 in the base 86. This places two watthour meters plugged into the respective shells 88 and 90 in series with each other for comparative testing of both meters, simultaneous metering of reactive power and kilowatt hours, etc.

Figure 4:
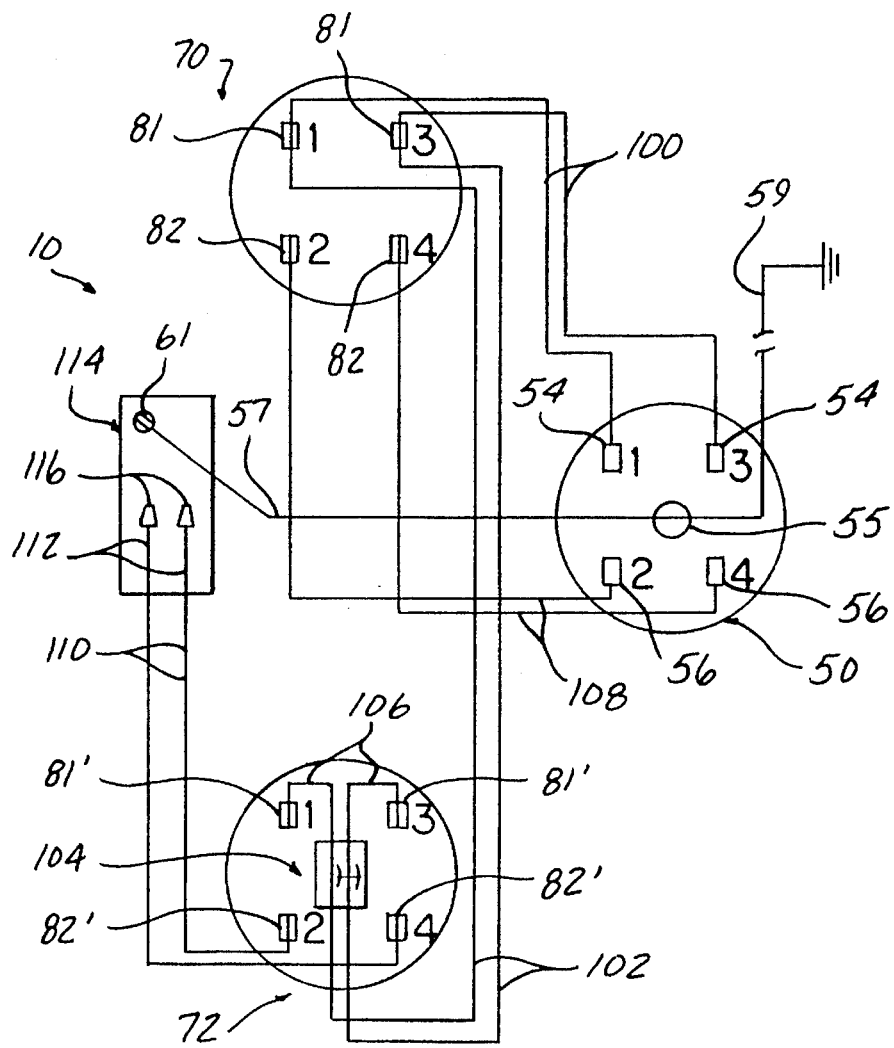
FIG. 4 is a schematic diagram of the metered electrical service tap of the present invention shown in FIGS. 1 and 2.

FIG. 4 depicts a schematic diagram of one embodiment of the interconnection of the contacts 81, 82, 81' and 82' in the two shells 70 and 72 of the metered electrical service tap 10 of the present invention to the blade terminals 54 in the base 50. As shown in FIG. 4, the line blade terminals 54 in the base 50 are connected by means of suitable electrical conductors 100, such as rigid, preformed bus bars or flexible cables, to the line blade terminals 84 of contacts 81 in the first shell 70. Electrical conductors 102 extend from the line jaw contacts 81 in the first shell 70 to the primary side terminals of a power disconnect means 104 mounted in the second shell 72. The power disconnect means 104 selectively controls the supply of electrical power through the second shell 72 to the junction box 114. The power disconnect means 104 may take the form of any suitable circuit breaker, ground fault circuit interrupt device (GFCI), fuses, etc. The secondary side terminals of the power disconnect means 104 are connected by means of conductors 106 to the line jaw contacts 81' in the second shell 72. At the same time, the line blade terminals 56 in the base 50 are connected by means of electrical conductors 108 to the load jaw contacts 82 in the first shell 70.

Figure 8:
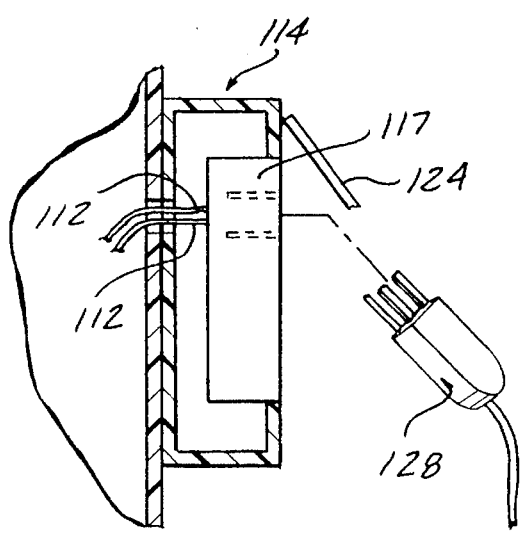
FIG. 8 is a partial, cross-sectional view of the junction box shown in FIG. 1.

A pair of electrical conductors 110 are each connected at one end to a load jaw contact 82' in the second shell 72 and extend to a second end 112 which is disposed within a junction box 114 mounted on the side wall 46 of the housing 40 as shown in FIGS. 1 and 8. The ends 112 of the conductors 110 may be terminated in wire nuts 116, as shown in FIG. 4, for easy connection to external electrical conductors shown by reference number 120 extending from the junction box 114 via a conventional cable connector 121 shown in FIG. 5. Optionally, the second ends 112 of the conductors 110 may be connected to a suitable electrical outlet 117 or other electrical connector, as shown in FIG. 8, mounted in the junction box 114 to provide a plug-in connection to an external cable 128 or electrical conductors.

It should be noted that the external junction box 114 may be mounted on any side of the housing 40, depending upon the mounting position of the housing 40 or a building.

A cover 124 may be mounted on the junction box 114, as shown in FIGS. 1 and 8, to releasibly close connections to the conductors 110 on the junction box 114. The cover 124 may also be provided with a suitable lock, not shown, to control access to the wiring connections within the interior of the junction box 114. Alternately, the cover 124 may be integrally formed as part of the junction box 114, with the external conductors 120 passing from the junction box by means of the cable connector 121 shown in FIG. 5.

Figure 12:
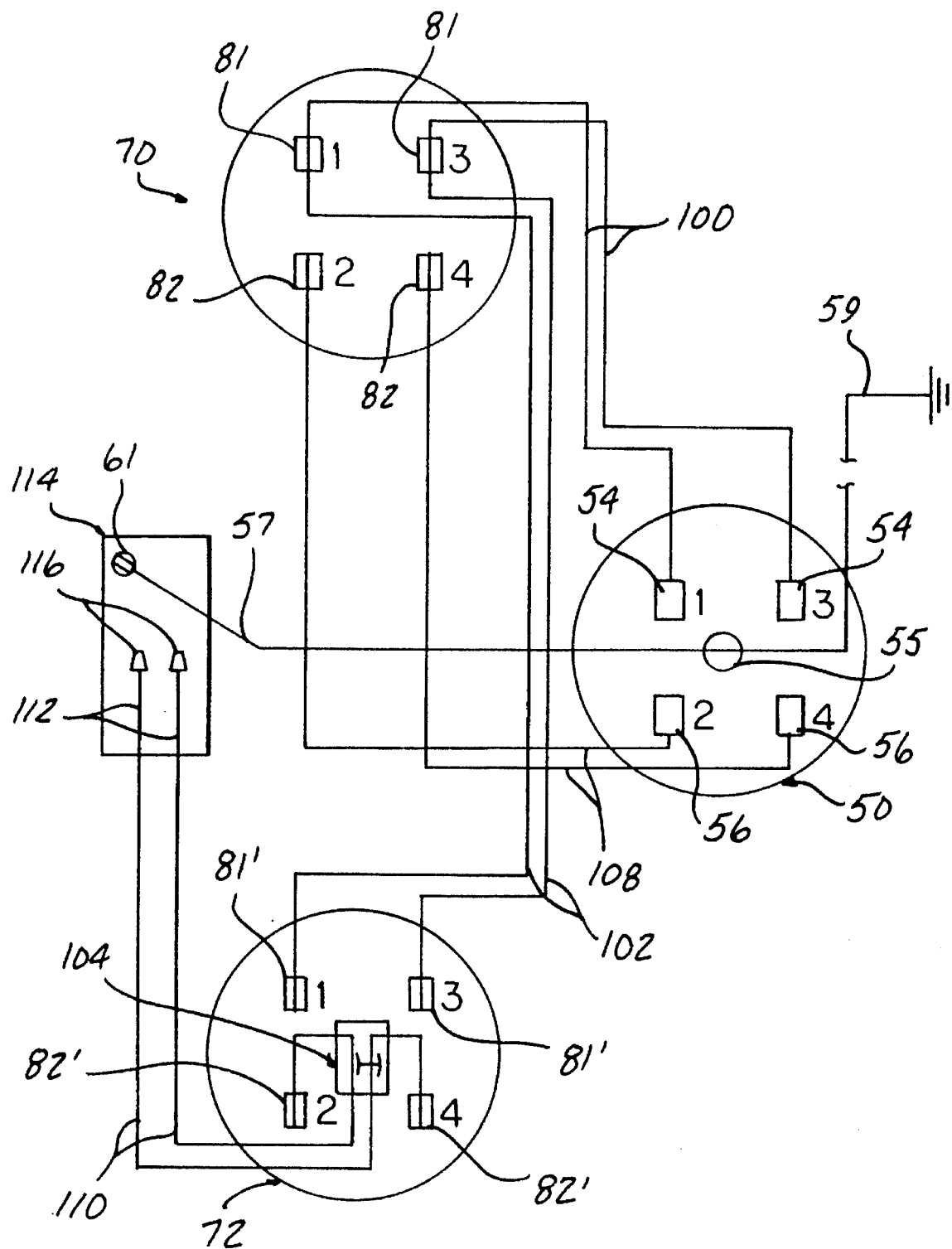
FIG. 12 is a schematic diagram of another embodiment of the metered electrical service tap.

An alternate interconnection embodiment is shown in FIG. 12. In this embodiment, the line contacts 81 in the shell 70 are still connected in parallel with the line contacts 81' in the shell 72 by means of conductors 102. However, in this embodiment, the conductors 102 run directly from the line contacts 81 in the shell 70 to the line contacts 81' in the shell 72 without passing through the power disconnect device 104. This provides constant power to the line contacts 81' in the shell 72 which is useful in conjunction with electronic watthour meters which require power on the line contacts to charge internal batteries within such electronic watthour meters.

In the embodiment shown in FIG. 12, the load contacts 82' in the shell 72 are connected to one side of the power disconnect device 104. The opposite or secondary side of the power disconnect device 104 is connected to the conductors 110 which run to the junction box 114. In this embodiment, a watthour meter plugged into the second shell 72 still provides metered electric power to a load connected to the ends 112 of the conductors 110 in the junction box 114 completely separate from metered power supplied through a watthour meter plugged into the first shell 70.

Figure 13:
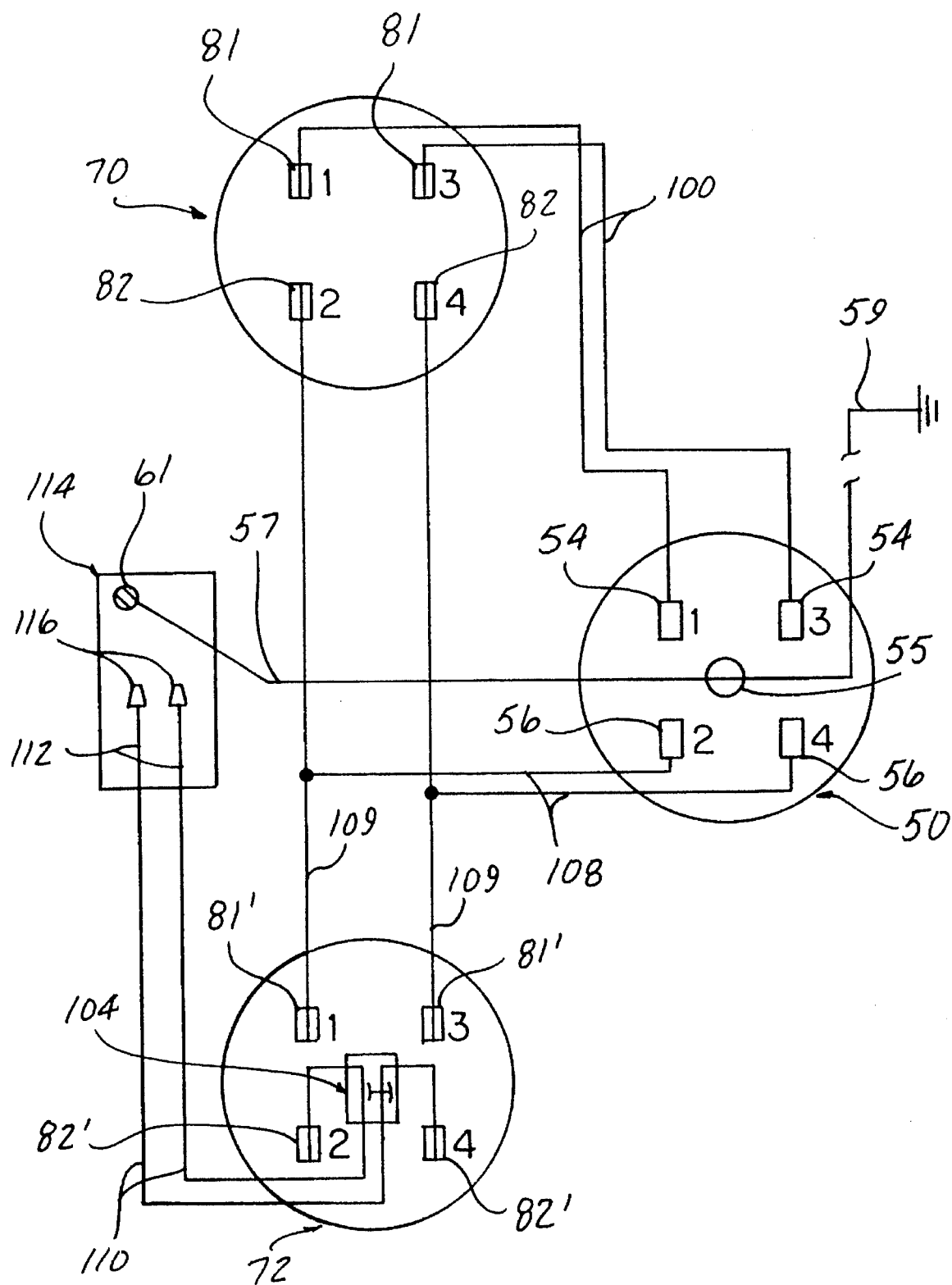
FIG. 13 is a schematic diagram of yet another embodiment of the metered electrical service tap of the present invention.

Yet another interconnection arrangement for the contacts in the shells 70 and 72 is shown in FIG. 13. In this embodiment, the line contacts 81 in the shell 70 are connected via conductors 100 to the line terminals 54 in the base 50. The load contacts 82 in the shell 70 are connected by conductors 108 to the load terminals 56 in the base 50, as in the previous embodiments shown in FIGS. 4 and 12.

However, separate conductors 109 extend from the load contacts 82 in the shell 70 to the line contacts 81' in the shell 72. The load contacts 82' in the shell 72 are connected through the power disconnect device 104 to the conductors 110 which extend to the junction box 114 as in the second embodiment described above and shown in FIG. 12.

In the wiring interconnection arrangement shown in FIG. 13, the two shells 70 and 72 are connected in series such that all power drawn through a watthour meter plugged into the second shell 72 will also be metered by a watthour meter plugged into the first shell 70. Further, the load contacts 82 of the first shell 70 are conventionally connected via the blade terminals 56 in the base 52 to a load distribution network in a building thereby providing meter power via a watthour meter plugged into the jaw contacts 81 and 82 in the shell 70 to the a load distribution network. Any power drawn through the conductors 110 will be measured by a watthour meter plugged into the second shell 72 and such power can be subtracted from that measured by a watthour meter plugged into the shell 70 to obtain the power consumed by a load connected to the junction box 114.

This arrangement is more advantageously suited for a time of day metering when a typically lower rate is charged for power used during non-peak hours, such as during the evening or early morning. Such time of day power would be measured by a watthour meter plugged into the second shell 72.

It will be understood that in the embodiment shown in FIG. 13, the power disconnect device 104 could alternately be connected between the conductors 109 extending from the load contacts 82 in the first shell 70 and the load contacts 81' in the shell 72, rather than between the load contacts 82' and the conductors 110 as specifically shown in FIG. 13 and described above.

Figure 6:
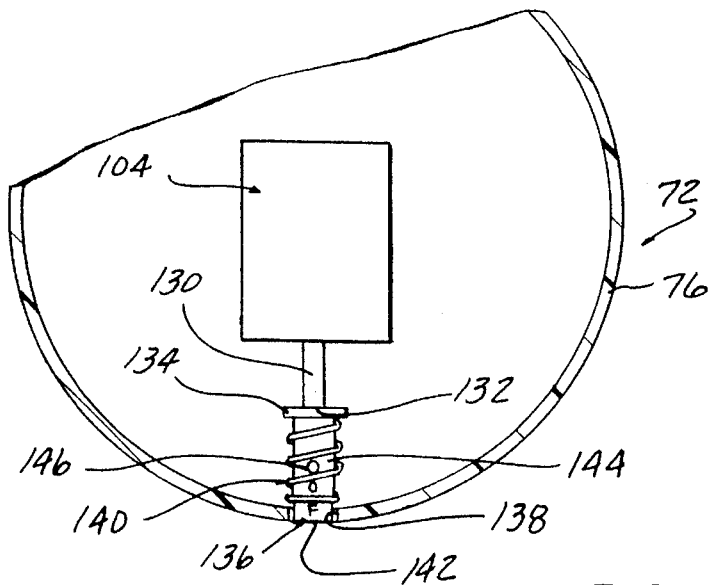
FIG. 6 is a partial, front elevational view showing the power disconnect means employed in the metered electrical service tap shown in FIG. 1 in the energized or "on" position.
Figure 7:
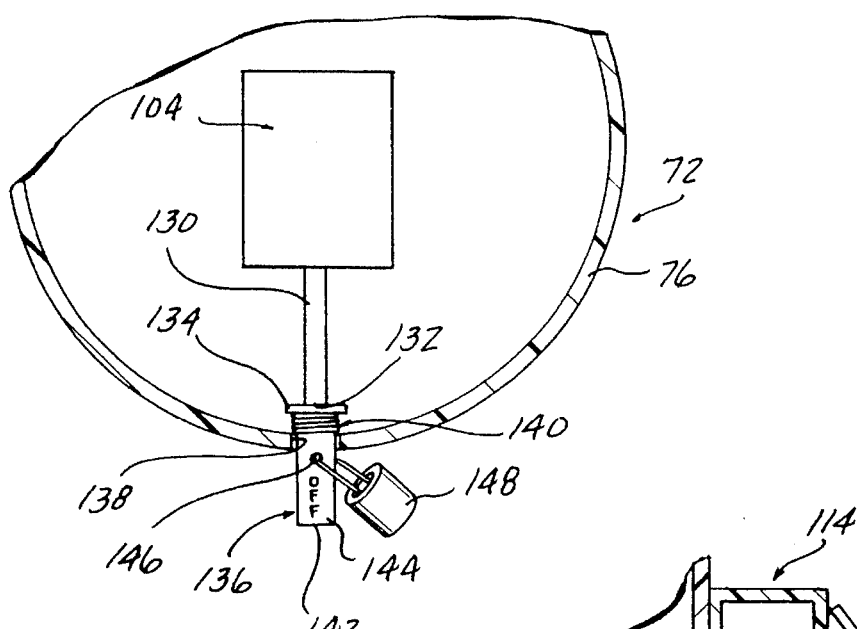
FIG. 7 is a partial, front elevational view of the power disconnect means in an "off" or deenergized position.

Referring now to FIGS. 6 and 7, there is depicted further details of the power disconnect means or device 104. As is conventional, in the case of a circuit breaker forming the power disconnect device 104, the circuit breaker 104 includes a movable plunger 130 which extends outward from the housing of the circuit breaker. The plunger 130 is movable from an extended position shown in FIG. 7 when the circuit breaker 104 is in an off or open condition toward the circuit breaker 104 to the position shown in FIGS. 5 and 6 to move circuit breaker contacts, not shown, to a closed position connecting the conductors 102 to the conductors 106 extending from the circuit breaker 104 to the line jaw contacts 81' in the second shell 72 as shown in FIG. 4.

The plunger 130 terminates in an exterior end 132 which engages an enlarged diameter end flange 134 formed on a movable rod 136. The rod 136, which preferably has a cylindrical shape, is movably mounted in an aperture 138 in the annular side wall 76 of the second shell 72. A biasing means 140, such as a coil spring, is seated between the annular side wall 76 and the enlarged flange 134 and normally biases the rod 136 into contact with the end 132 of the plunger 130.

FIG. 6 depicts the plunger 130 and the rod 136 in a position corresponding to an "on" or conducting state of the circuit breaker 104. In this position, the outer end 142 of the rod 136 is substantially contained within the shell 72 or is disposed in close proximity with the annular side wall 76 of the shell 72.

When the circuit breaker 104 is moved to or automatically trips to an "off" position, the plunger 130, as shown in FIG. 7, moves outward from the housing of the circuit breaker 104. This drives the outer end 142 of the rod 136 outward beyond the annular side wall 76 of the shell 72 until a portion of the rod 136 is exposed exteriorly of the annular side wall 76 of the shell 72. Suitable indicia denoted by reference number 144, such as the word "off", may be formed or placed on the exterior surface adjacent one end of the rod 136 to indicate that the circuit breaker 104 is deenergized or "off". This increases safe use of the metered service tap 10 since the condition of the circuit breaker 104 is readily ascertainable exteriorly of shell 72 and watthour meter 16 mounted therein. This enables a service person to easily and quickly recognize that the circuit breaker 104 is "off" when making connections to the ends 112 of the conductors 110 in the junction box 114.

In addition, as also shown in FIG. 7, a bore 146 is formed laterally through the rod 136 between the ends of the rod 136 and is located exteriorly of the side wall 76 of the shell 72 when the circuit breaker 104 is in the "off" or deenergized state. The bore 146 receives a lock means 148, such as a wire seal or a padlock shown in FIG. 7. With the lock 148 in place through the bore 146 in the rod 136, the rod 136 is prevented from being pushed inward into the shell 72 to close the circuit breaker 104. This provides additional safety to a service person making wiring connections in the junction box 114.

Figure 9:
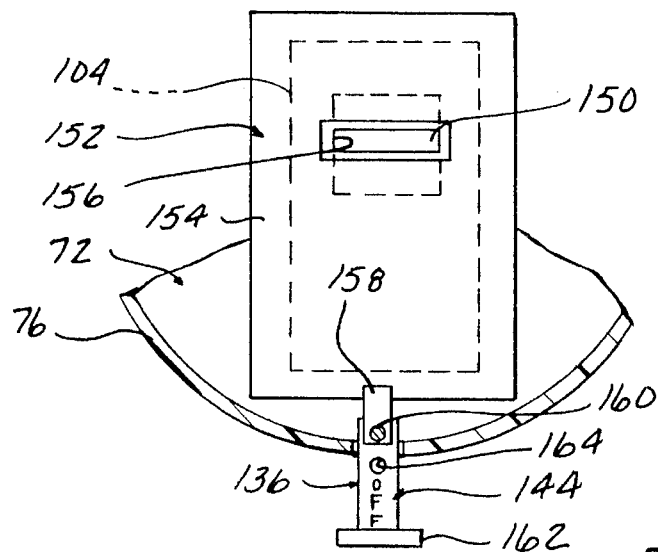
FIG. 9 is a partial, front elevational view showing another embodiment of the power disconnect means.

Another embodiment of the power disconnect means 104 is shown in FIG. 9. In this embodiment, the power disconnect means 104 comprises a conventional ground fault circuit interrupter device (GFCI) which is mounted in the shell 72. The GFCI 104 includes an external switchable member 150 which moves between at least first and second positions corresponding to conducting and non-conducting states of the GFCI.

Means denoted by reference number 152 are provided for coupling movement of the external member 150 to movement of the rod 136 as well as enabling movement of the rod 136 to control the switching of the GFCI 104 from a non-conducting state to a conducting state. The coupling means 152 preferably comprises a plate 154 which is slidably mounted over the GFCI 104. The plate 154 includes an aperture 156 which surrounds the external member 150 extending outward from one surface of the GFCI 104. The plate 154 moves with movement of the external member 150 of the GFCI through engagement of the portions of the plate surrounding the aperture 156 with the external member 150 on the GFCI 104. A tab 158 is connected at one end to the plate 154 and at another end to the rod 136 by suitable means, such as a screw-type fastener 160.

As in the previous embodiment shown in FIGS. 6 and 7, the rod 136 has indicia 144, preferably in the form of the letters "off" formed thereon, positioned to be visible exteriorly of the sidewall 76 of the second shell 72 when the power disconnect means or GFCI 104 is in a non-conducting state. An end cap 162 may be optionally mounted on the exterior end of the rod 136 to provide a suitable user engageable surface for urging the rod 136 inward toward the sidewall 76 of the shell 72 which, through the engagement of the rod 136 with the plate 154 and the external member 150 on the GFCI 104, causes manual switching of the GFCI 104 from a non-conducting state to a power conducting state.

An aperture 164 may also be formed in the plunger 136 at a position to be disposed externally of the sidewall 76 of the shell 72 when the rod 136 is in the outward extending position corresponding to a non-conducting state of the GFCI 104. The aperture 164 is sized to receive a suitable lock, such as a padlock, therethrough to prevent inward manual movement of the rod 136. This retains the GFCI 104 in the non-conducting state for additional safety to an installer.

It will be understood that in the circuit breaker embodiment of the power disconnect means 104 shown in FIGS. 6 and 7, the rod 136 may be eliminated and the plunger 130 on the circuit breaker extended to an elongated length so as to pass through the aperture in the side wall 76 of the shell 72 when the circuit breaker is in the off or power disconnecting position. In this position, the exterior end of the plunger 130 extends exteriorly from the side wall 76. The "off" indicia 144 may be printed on the exterior end of the plunger 130. In addition, the aperture 146 may be formed in the exterior end of the plunger 130 to receive a suitable lock means, as described above, to lock the circuit breaker or GFCI in the "off" position.

Figure 14:
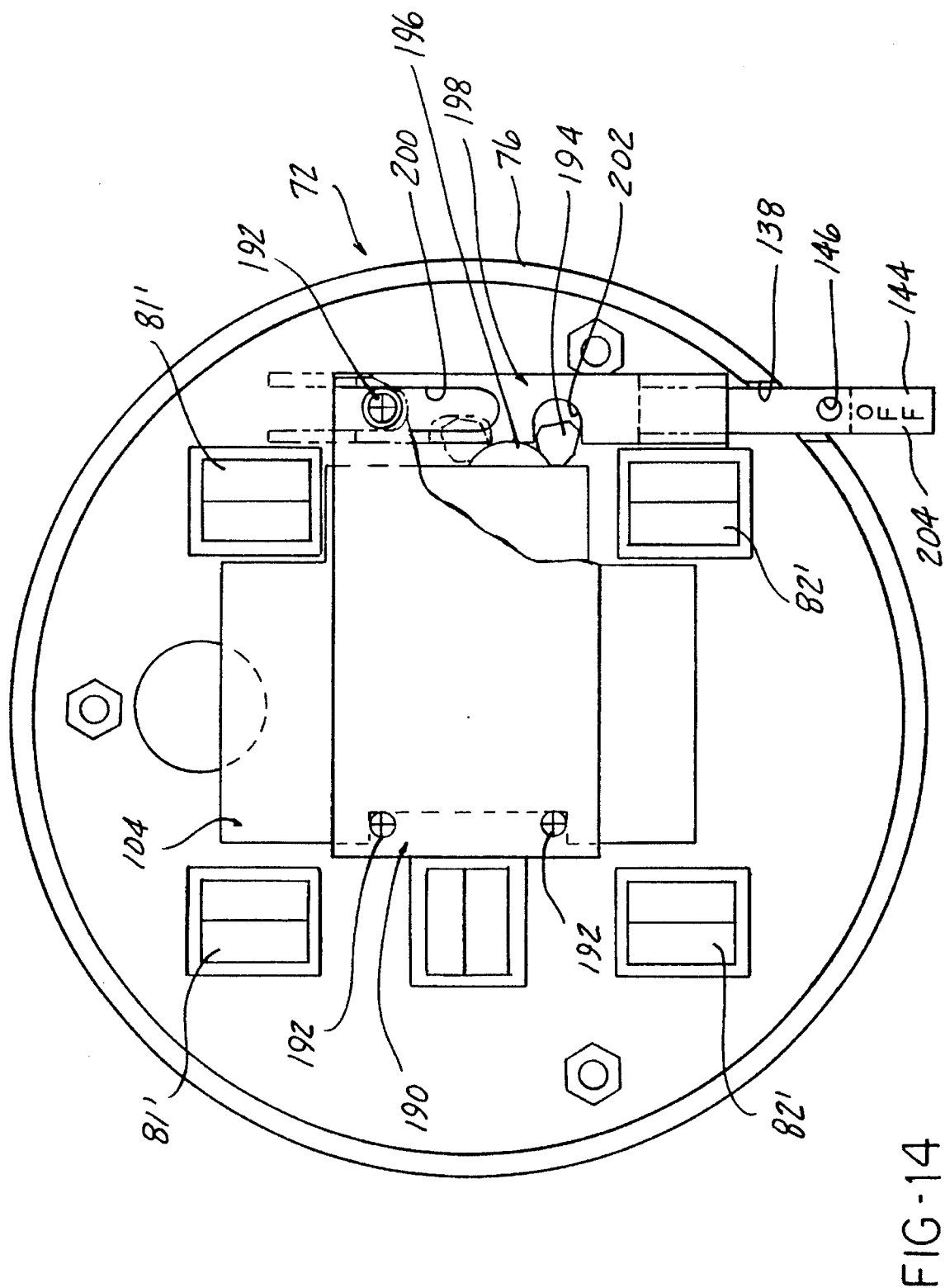
FIG. 14 is a front elevational view of another embodiment of a power disconnect means used in the metered electrical service tap of the present invention.

In another embodiment of a power disconnect means 104 is shown in FIG. 14. In this embodiment, the line contacts 81' and load contacts 82' as well as the connections to and from the power disconnect device 104 may be provided in any of the wiring connections described above and shown in FIGS. 4, 12 and 13.

In this embodiment, the power disconnect means 104 is in the form of a circuit breaker mounted in a fixed position on the bottom of the shell 72 by means of a mounting plate 190. Four fasteners 192, only three of which are shown, are disposed at the corners of the mounting plate 190 and extend through the bottom of the shell 72.

A pivotal arm 194 is formed on a rotatable disk 196 mounted on the circuit breaker 104. The arm 194 switches positions from a first position shown in solid in FIG. 14 to a second position shown in phantom when the circuit breaker 104 is respectively in the open or power disconnecting position and a closed or power conducting position.

A plunger denoted generally by reference number 198 is slidably disposed within the shell 72 adjacent one side of the circuit breaker 104. The plunger 198 includes an end slot 200 which slidably extends around one of the fasteners 192. A side slot 202 is also formed in the plunger 198 and receives the pivotal arm 194 such that pivotal movement of the arm 194 between the first and second positions described above results in sliding movement of the plunger 198 between corresponding first and second positions.

The plunger 198 has an elongated length and terminates in an end portion 204 which slidably extends through the aperture 138 in the side wall 76 of the shell 72 when the plunger 198 is in the first position shown in solid in FIG. 14. The lock receiving aperture 146 is formed in the end portion 204 of the plunger 198 and is likewise disposed exteriorly of the side wall 76 when the plunger 198 is in the first position to receive a suitable lock means therethrough, as described above, to lock the plunger 198 and thereby the circuit breaker 104 in the off or power disconnecting position. Suitable "off" indicia 144 is also formed on the end portion 204 of the plunger 198 in the same manner as described above in the previous embodiments of the power disconnect means 104.

In use, inward force on the end portion 204 of the plunger 198 will cause the plunger 198 to slide from the first position shown in solid to the second position shown in phantom in FIG. 14. This sliding movement causes pivotal movement of the arm 194 and rotation of the disk 196 on the circuit breaker 104 thereby resulting in a switching of the circuit breaker 104 to the closed or power conducting position.

Figure 10:
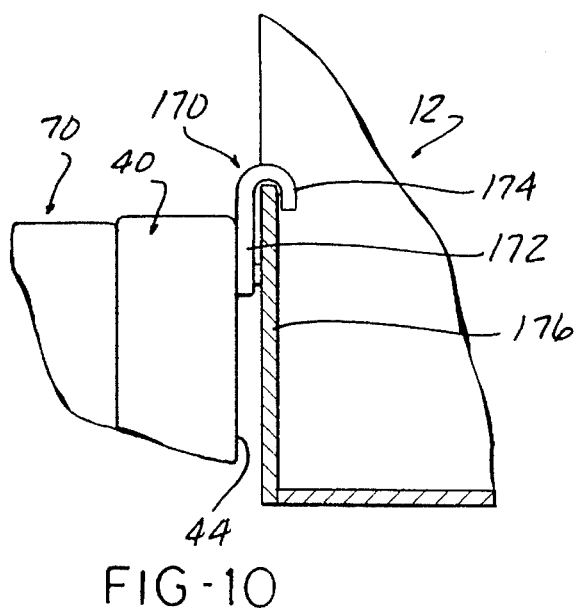
FIG. 10 is a partial, cross sectional view showing the temporary mounting of the housing on a watthour meter socket via a hanger.
Figure 11:
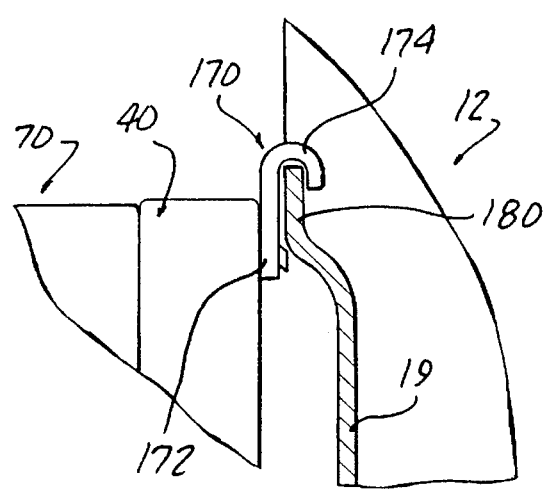
FIG. 11 is a partial, cross sectional view showing the temporary mounting of the metered service tap on a ringless-style watthour meter socket cover via a hanger.

Another feature of the present invention is shown in FIGS. 1 and 2 and in greater detail in FIGS. 10 and 11. A hanger 170 is mounted on the back wall 44 of the housing 40 by means of a suitable fastener, such as the fastener 173 used to connect the shell 70 to the housing 40. The hanger 170 has a planar leg 172 mounted flush with the back wall 44 of the housing 40. The leg 172 terminates in an outwardly extending hook 174 which has an outer end spaced from the opposed portion of the leg 172 so as to be able to be temporarily hooked over the upper edge of a flange 176 formed on the bottom portion of the front of the socket 12. The socket 12 depicted in FIG. 10 is a ring-style socket shown in greater detail in FIG. 1.

For ringless-style sockets, as shown in FIG. 11, the front cover 19 of the socket 12 terminates in a raised, annular flange 180 which surrounds a meter receiving aperture in the cover 19. The hook 170 is designed to engage the edge of the flange 180 in the cover 19 to temporarily mount the metered service tap 10 to the front cover 19 of the socket 12.

In both of the embodiments shown in FIGS. 10 and 11, the hook 170 provides for temporary mounting of the metered service tap 10 on a watthour meter socket 12 during connection of the ground wire 59 extending externally from the housing 40 through the socket 12 and directly to a secure electrical connection with a ground electrode 182 as shown in FIG. 1. It will be understood that the ground wire 59 is first passed through the meter aperture in the cover 19 of the socket 12 before being passed through the housing 18 of the socket 12 to a connection with the ground electrode 182 as shown in FIG. 1.

In summary, there has been disclosed a unique metered electrical service tap which provides side-by-side arranged watthour meter receiving shells, each of which receives a watthour meter for separate metered service to two different loads. The load contacts in one of the shells are connected by electrical conductors to a junction box mounted on the housing of the metered electrical service tap for easy connection to an external electrical conductor or cable to provide metered electrical service exteriorly of the socket adapter. The present metered electrical service tap also provides enhanced safety features through the use of an elongated plunger or a movable rod engaged with the plunger of a circuit breaker or other power disconnect means mounted in one of the watthour meter receiving shells. The plunger or rod may be locked in an extended position with the end portion disposed exteriorly of the shell when the circuit breaker is deenergized to prevent the circuit breaker from being closed and electrical power inadvertently applied to the conductors in the junction box.

What is claimed is:

1. A metered electrical service tap mountable in a watthour meter socket having a plurality of socket line jaw contacts connected to electric utility power distribution network conductors and a plurality of socket load jaw contacts connected to load distribution network conductors, the socket line and load jaw contacts adapted to normally receive meter blade terminals of a watthour meter, the metered electrical service tap comprising:

a housing having a hollow interior chamber;

a plurality of electrical line and load blade terminals mounted in and extending outward from the housing for releasible insertion into socket line and load jaw contacts of a watthour meter socket;

first and second watthour meter receiving means mounted on the housing, each adapted for receiving a separate watthour meter therein having meter blade terminals;

a plurality of line and load jaw contacts mounted in each of the first and second watthour meter receiving means for electrically receiving meter blade terminals of a watthour meter therein in a plug-in connection;

first electrical conductors disposed in the housing and electrically connecting the line jaw contacts in the first and second watthour meter receiving means in parallel to each other and to the electrical line blade terminals in the housing;

second electrical conductors connected at one end to the load jaw contacts in the second watthour meter receiving means, an other end of the second electrical conductors being connectible to an external electrical conductor separate from the load distribution network conductors to provide metered electrical power to the external electrical conductor; and third electrical conductors connecting the load jaw contacts of the first watthour receiving means to the load blade terminals in the housing.

2. The metered electrical service tap of claim 1 further comprising:

a junction box attached to the housing and disposed in communication with the interior chamber of the housing; and the conductor means including electrical conductors having one end connected to the load jaw contacts of one of the first and second watthour meter receiving means and having another end disposed in the junction box for connection to an external electrical conductor.

3. The metered electrical service tap of claim 2 further comprising:

an earth ground conductor extending through the housing to a ground terminal mounted in the junction box.

4. The metered electrical service tap of claim 3 further comprising:

hanger means, attached to the housing, for temporarily hanging the housing externally on a watthour meter socket to enable the earth ground conductor to be connected from the housing and through the watthour meter socket to earth ground.

5. The metered electrical service tap of claim 3 wherein:

the earth ground conductor is connected through the watthour meter socket to an earth ground electrode.

6. The metered electrical service tap of claim 1 further comprising:

electrical power disconnect means mounted in the second watthour meter receiving means and connected to certain jaw contacts in the second watthour meter receiving means for selectively controlling the supply of electrical power through the second watthour receiving means.

7. The metered electrical service tap of claim 6 further comprising:

means for locking the electrical power disconnect means in a non-power conducting state, the locking means positioned exteriorly of the second watthour meter receiving means.

8. The metered electrical service tap of claim 7 wherein:

the electrical power disconnect means includes a plunger movable between at least two positions corresponding respectively to power conducting and non-power conducting states of the electrical power disconnect means;

the plunger having a length to slidably extend exteriorly through an aperture in the second watthour meter receiving means, with an end portion of the plunger disposed exteriorly of the second watthour receiving means when the power disconnect means is in the non-power conducting state; and the locking means coupled to the end portion of the plunger.

9. The metered electrical service tap of claim 8 further comprising:

indicia disposed on the end portion of the plunger and visible exteriorly of the second watthour meter receiving portion when the electrical power disconnect means is in the non-power conducting state to indicate that the electrical power disconnect means is in the non-power conducting state.

10. The metered electrical service tap of claim 8 wherein the locking means comprises:

a aperture formed in the end portion of the plunger, the aperture disposed externally of the second watthour meter receiving means when the electrical power disconnect means in the non-power conducting state and adapted to receive a lock therethrough.

11. The metered electrical service tap of claim 6 wherein:

the electrical power disconnect means includes an external member movable between at least two positions corresponding respectively to conducting and non-power conducting states of the electrical power disconnect means;

a rod slidably mounted through an aperture in the second watthour receiving means; and means for connecting the external member on the electrical power disconnect means to the rod such that the rod moves with movement of the external member, with an end portion of the rod extending externally of the second watthour receiving means when the electrical power disconnect means is in the non-power conducting state.

12. The metered electrical service tap of claim 11 wherein the external member on the electrical power disconnect means includes:

a reciprocal plunger having an end extending outward of the electrical power disconnect means and movable from a first position disposed close to the electrical power disconnect means when the electrical power disconnect means is in the power conducting state and extending away from the electrical power disconnect means when the electrical power disconnect means is in an electrical non-power conducting state.

13. The metered electrical service tap of claim 12 wherein the connecting means comprises:

means for biasing the rod into contact with the end of the plunger such that the rod is movable with movement of the plunger.

14. The metered electrical service tap of claim 11 further comprising:

indicia disposed on the end portion of the rod and visible exteriorly of the second watthour meter receiving portion when the electrical power disconnect means is in the non-power conducting state to indicate that the electrical power disconnect means is in the non-power conducting state.

15. The metered electrical service tap of claim 11 further comprising:

means for locking the rod in an extended position with the end portion extending outward from the second watthour meter receiving means to prevent the rod from being urged toward a position changing the state of the electrical power disconnect means.

16. The metered electrical service tap of claim 15 wherein the locking means comprises:

a aperture formed in the end portion of the rod, the aperture disposed externally of the second watthour meter receiving means when the rod is in the extended position and adapted to receive a lock therethrough.

17. The metered electrical service tap of claim 6 wherein the electrical power disconnect means comprises a circuit breaker.

18. The metered electrical service tap of claim 6 wherein the electrical power disconnect means comprises a ground fault circuit interrupter.

19. The metered electrical service tap of claim 1 further comprising:

electrical power disconnect means, mounted in the second watthour receiving means and electrically connected between at least one pair of the fine contacts in the first watthour receiving means and the load contacts in the second watthour receiving means, and the load contacts in the second watthour receiving means and an electrical load external to the second watthour receiving means, for controlling the supply of electrical power to the load external to the second watthour meter receiving means.

20. A metered electrical service tap mountable in a watthour meter socket having a plurality of socket line jaw contacts connected to electric utility power distribution network conductors and a plurality of socket load jaw contacts connected to load distribution network conductors, the socket line and load jaw contacts adapted to normally receive meter blade terminals of a watthour meter and receiving at least two watthour meters therein, each having meter blade terminals, the metered electrical service tap comprising:

a housing having a hollow interior chamber;

a plurality of electrical line and load blade terminals mounted in and extending outward from the housing for releasible insertion into socket line and load jaw contacts of a watthour meter socket;

first and second watthour meter receiving means mounted on the housing, each adapted for receiving a watthour meter therein;

a plurality of line and load jaw contacts mounted in each of the first and second watthour meter receiving means for electrically receiving the blade terminals of a watthour meter therein in a plug-in connection;

first electrical conductors, disposed in the housing and electrically connecting the line jaw contacts in the first watthour meter receiving means to the electrical line blade terminals in the housing;

second electrical conductors disposed in the housing and electrically connecting the load jaw contacts in the first watthour meter receiving means and the line jaw contacts in the second watthour meter receiving means in series to the load blade terminals in the housing;

a junction box attached to the housing and disposed in communication with the interior chamber of the housing; and electrical conductors having one end connected to the load jaw contacts of the second watthour meter receiving means and having another end disposed in the junction box for connection to an external electrical conductor.

21. The metered electrical service tap of claim 20 further comprising:

an earth ground conductor extending through the housing to a ground terminal mounted in the junction box.

22. The metered electrical service tap of claim 21 wherein:

the earth ground conductor is connected through the watthour meter socket to an earth ground electrode.

23. The metered electrical service tap of claim 21 further comprising:

hanger means, attached to the housing, for temporarily hanging the housing externally on a watthour meter socket to enable the earth ground conductor to be connected from the housing and through the watthour meter socket to earth ground.

* * * * *